United States Patent [19]
Torii et al.

[11] Patent Number: 5,399,870
[45] Date of Patent: Mar. 21, 1995

[54] POSITION DETECTING METHOD AND APPARATUS FOR LASER SENSOR

[75] Inventors: Nobitoshi Torii, Hachioji; Ryo Nihei, Minamitsuru; Yasuo Naito, Minamitsuru; Hiroshi Wakio, Minamitsuru; Takashi Iwamoto, Minamitsuru, all of Japan

[73] Assignee: Fanuc Ltd., Yamanashi, Japan

[21] Appl. No.: 961,901

[22] PCT Filed: May 15, 1992

[86] PCT No.: PCT/JP92/00630
§ 371 Date: Jan. 8, 1993
§ 102(e) Date: Jan. 8, 1993

[87] PCT Pub. No.: WO92/20993
PCT Pub. Date: Nov. 26, 1992

[30] Foreign Application Priority Data

May 15, 1991 [JP] Japan ................. 3-138548
Jun. 10, 1991 [JP] Japan ................. 3-165038

[51] Int. Cl.[6] .............................. G01N 21/86
[52] U.S. Cl. ......................... 250/561; 356/3.01
[58] Field of Search .................. 250/201.6, 561; 356/375, 376, 1, 4

[56] References Cited

U.S. PATENT DOCUMENTS

| | | | |
|---|---|---|---|
| 4,490,039 | 12/1984 | Bruckler et al. | 356/121 |
| 4,499,383 | 2/1985 | Loose | 250/561 |
| 4,708,483 | 11/1987 | Lorenz | 356/375 |
| 4,873,449 | 10/1989 | Paramythioti et al. | 250/560 |
| 5,280,542 | 1/1994 | Ozeki et al. | 356/375 |

FOREIGN PATENT DOCUMENTS

| | | |
|---|---|---|
| 0279730 | 8/1988 | European Pat. Off. |
| 56-138204 | 10/1981 | Japan . |
| 2-172214 | 7/1987 | Japan . |
| 63-182504 | 7/1988 | Japan . |
| 1-213506 | 8/1989 | Japan . |

OTHER PUBLICATIONS

P. Cielo, et al., *Improvement of subpixel resolution in triangulation ranging by astigmatic spot projection and wide-aperture line array imaging*, Optics & Laser Technology, vol. 20, No. 1, Feb. 1988, pp. 19-24.

Primary Examiner—David C. Nelms
Attorney, Agent, or Firm—Staas & Halsey

[57] ABSTRACT

The present invention relates to a position detecting method and its apparatus that is capable of improving detecting accuracy in a laser sensor using a Charged Coupled Device (CCD) as a light receiving element. A sum of products of an output $C_i$ of each cell in a light receiving element and a cell position $X_i$ is obtained, and the cell outputs $C_i$ are added. When the cell output $C_i$ exceeds a predetermined threshold value, a counter is reset. When the cell output $C_i$ decreases down below the threshold value, the sample hold signal SH is counted. When the counted value of the counter becomes a predetermined value, a division circuit divides the above-obtained sum of products by the above addition value to obtain a center of gravity of the sum of products as a light receiving position. Then, thus obtained value is stored in a latch buffer. When a plurality of light receiving positions are obtained, the control unit picks out only the light receiving position of primary reflection beam from among them to identify the object position. Accordingly, the accuracy of the position detecting operation can be improved, since resolution in position detecting according to the invention is not determined on the unit of cell, but a light receiving position between adjacent cells in CCD can also be detected.

17 Claims, 11 Drawing Sheets

| ADDRESS J | 0~a | (a+1)~(b-1) | b | (b+1)~(c-1) | c~d |
|---|---|---|---|---|---|
| | (As) | | (Ac) | | (Ae) |
| SCANNING ANGLE | 0~aΔθ | (a+1)Δθ~(b-1)Δθ | bΔθ | (b+1)Δθ~(c-1)Δθ | cΔθ~dΔθ |
| REGISTER RL(j) | LD1 ELEMENT | LU1 ELEMENT | Q ELEMENT | LU2 ELEMENT | LU3 ELEMENT |
| REGISTER RS(j) | LD1 ELEMENT | LD2 ELEMENT | Q ELEMENT | LD3 ELEMENT | LU3 ELEMENT |

| ADDRESS j | 0~b-1 | b | b+1~d |
|---|---|---|---|
| REGISTER RL(j) | | Q ELEMENT | LU2 ELEMENT / LU3 ELEMENT |
| REGISTER RS(j) | LD1 ELEMENT / LD2 ELEMENT | | |

POSITION DETECTING METHOD AND APPARATUS FOR LASER SENSOR

TECHNICAL FIELD

The present invention relates to a laser sensor equipped in a robot performing arc welding, sealing and the like, more particularly to a position detecting method and its apparatus for detecting an object position in an operation of welding, sealing and the like by use of this sensor.

BACKGROUND ART

Conventionally, an arc welding robot, a sealing robot and the like are equipped with a laser sensor for detecting a welding position or a sealing position etc.

This laser sensor is comprised as shown in FIG. 1. In FIG. 1, a detecting unit 10 includes a laser oscillator 11, a swing mirror (i.e. galvanometer) 12 that causes a laser beam emitted from the laser oscillator 11 to scan, and an optical system 13 that converges a reflection beam reflected back on an objective so as to form an image on a light receiving element 14. A control unit 20 includes a laser actuating unit 21 for actuating the laser oscillator 11 to generate a laser beam, a mirror scanning unit 22 that causes the swing mirror 12 to pivot about its axis, and a signal detecting unit 23 for detecting a position of a received beam according to the position detected by the light receiving element 14.

The laser oscillator 11 is actuated by the laser actuating unit 21 to emit a laser beam. The mirror scanning unit 22 cooperates with the laser actuating unit 21 to cause the swing mirror 12 to perform a scanning so that the laser beam emitted from the laser oscillator 11 is directed toward a predetermined point on the object 30. The laser beam reflected back on the object 30 is converged by the optical system 13 to form an image on the light receiving element 14 in accordance with the reflected position on the object 30. This light receiving element is normally constituted of a PSD (Position Sensitive Detector) of non-split & integration type element, or a CCD (Charged Coupled Device) of split type element.

In the case where a PSD is used as a light receiving element, a beam received on a light receiving surface as shown in FIG. 2, i.e., an image of a reflected beam, is converted into a photoelectric current, and then outputted from electrodes on both sides of the element. A light receiving position $x_a$ is determined based on the values of two electric currents outputted from the electrodes on both sides of the light receiving element.

To be more specific, given that a distance from the center of the light receiving element to the respective electrode is L; a distance from the center of the light receiving element to the light receiving position is $x_a$; and further, the two electric current values are $I_1$ and $I_2$, the distance $x_a$ can be obtained by the following equation 1.

$$x_a = L \cdot (I_2 - I_1)/(I_2 + I_1) \quad (1)$$

On the basis of thus obtained position $x_a$ on the light receiving element, a position of the object 30 with respect to the sensor is calculated as will be described later.

In the case where a CCD is used as the light receiving element, a beam received on a light receiving surface, i.e., an image of a reflected beam, is converted into a photoelectron and then stored into its cell. Electric charges stored in respective cells are outputted one after another from an outermost end at predetermined intervals. In the case of a CCD, the larger the quantity of the light received by a cell, the larger the amount of the electric charge stored by the cell. Accordingly, a position that has received the largest quantity of light reflected can be identified by detecting the position of the cell that gives the largest output. Thus, on the basis of such a position, the position of the object 30 with respect to the sensor can be calculated.

FIG. 3 is a view illustrating a method for determining a coordinate position (X, Y) of the object 30 with respect to the sensor on the basis of the position $x_a$ detected by the light receiving element 14. In this method, assume that a sensor origin (0, 0) is located on a straight line passing the center of the optical system 13 and the center of the light receiving element 14 (this straight line is hereinafter referred to as Y-axis, whereas a straight line perpendicular to the Y-axis is referred to as X-axis). Further assume a distance between the origin of the sensor and the center of the optical system 13 is defined as $L_1$; a distance between the center of the optical system and the center of the light receiving element 14 is defined as $L_2$; an X-axis distance between the origin of the sensor and the pivot center of swing mirror 14 is defined as D; a Y-axis distance between the sensor origin and the pivot center of swing mirror is defined as $L_o$; a reflection angle of laser beam that is reflected at the swing mirror 12 toward the object 30 is defined as $\theta$ with respect to the Y-axis; and a distance of light receiving position on the light receiving element 14 is defined as $x_a$. Based on these assumptions the coordinate position (X, Y) at which the laser beam is received and reflected can be determined by calculating the following equations.

$$X = x_a \cdot [(L_1 - L_o) \cdot \tan\theta + D]/(x_a + L_2 \cdot \tan\theta) \quad (2)$$

$$Y = [L_1 \cdot x_a + L_2 \cdot (L_o \cdot \tan\theta - D)]/(x_a + L_2 \cdot \tan\theta) \quad (3)$$

In the case where a PSD is used as a light receiving element, as the PSD is a non-split & integration type element, such a light receiving element has very high detecting resolution. However, a PSD is disadvantageous in that the entire quantity of the light received on the light receiving surface is converted into photoelectric current, and thus the light receiving surface of the PSD tends to pick up not only a reflection beam required to be detected but also, a noise light occurring such as an arc light occurring in case of arc welding or a secondary reflection beam.

Accordingly, such a noise light is also converted, together with the required reflection beam, into a photoelectric current, and outputted from the electrodes provided at both ends of the light receiving element. As a result, the thus obtained photoelectric current adversely affects the detection of beam position in such a manner that the detected beam position, i.e., an incident position of the reflected beam, is offset from an actual position. Then, such a deviation of the detected beam position results in an overall deviation of the object position obtained through the calculation by above second and third equations, thereby deteriorating a detecting accuracy of the sensor.

For example, as shown in FIG. 4, a beam $B_o$ having been reflected on the swing mirror 12 is then reflected back at the object 30 as a primary reflection beam $B_1$ to form an image on the light receiving element 14. On the other hand, part of the beam reflected at the object 30 is further reflected at another portion of the object as a secondary reflection beam $B_2$ to form another image on the light receiving element 14.

Accordingly, the light receiving element 14 receives both the primary and secondary reflection beams. Thus, photoelectric currents outputted from both ends of the light receiving element 14 are affected by these primary and secondary reflection beams in such a manner that the output position $x_a$ is obtained as a position based on the composition of the primary reflection beam and the secondary reflection beam. Hence, the position of the object 30 calculated based on thus wrongly obtained output position $x_a$ is offset from an actual position, as indicated by 30' in FIG. 4.

In the case where a CCD is used as the light receiving element 14, since each of cells constituting the CCD can perform a photoelectrical conversion independently, it is possible to detect the noise light or the secondary reflection beam separately from the primary reflection beam. Therefore, the CCD is more advantageous compared with the above-described PSD in that it is free from the adverse effect of secondary reflection beam and the like.

However, this CCD has another disadvantage. That is, each cell of the CCD has to occupy a relatively large area required for receiving significant light quantity on it. Therefore, a distance between two adjacent cells is inherently large. This may result in a deterioration in a sensor resolution. In order to improve sensor resolution, it may be possible to provide a narrow cell which is capable of receiving a satisfactory light quantity. But it is not desirable in that, if it is desired to fabricate it, production costs of the element become expensive. Alternately, in order to improve sensor resolution, the number of cells constituting the CCD may be increased. However, such an element will unnecessarily increase the overall size of the element and, therefore, will not be practically used.

Furthermore, as the laser beam has coherency, an output waveform of the CCD is likely to become uneven. Therefore, the CCD has a problem such that the position of the cell to produce the largest output tends to change, and so it becomes impossible to correctly detect the beam receiving position.

DISCLOSURE OF INVENTION

An object of the present invention is to provide a position detecting method and its apparatus that uses a CCD as a light receiving element and is capable of improving its detecting resolution by executing the same integration processing as a PSD.

In order to accomplish the above object, a first mode of the present invention adopts a CCD as a light receiving element in a laser sensor for detecting an object position. According to this mode, a sum of products is obtained by successively multiplying an output value of each cell arrayed in said CCD by a position value of the cell so as to sum up thus multiplied values, and the sum total of said output values of respective cells is obtained. Then, a light receiving position is obtained by dividing the sum of products by the sum total.

Furthermore, in a preferable mode, there is provided a counter capable of being reset when the output value of the CCD exceeds a predetermined threshold value, counting a number of cells to be scanned after the output value of the CCD decreases down below the threshold value until the number of cells reaches a predetermined value, and then generating an output value of CCD which has reached the predetermined value.

The sum of products is divided by the sum total in response to this output value from the counter to obtain a light receiving position; the sum of products and said sum total are reset together; at least one light receiving position that exceeds the threshold value is detected during a predetermined interval; and a light receiving position, caused of primary reflection beam of a laser beam, is obtained on the basis of thus detected at least one light receiving position so as to detect the object position.

Furthermore, in a preferable mode, a scanning angle of the laser beam is changed in order to successively detect at least one light receiving position at the same scanning angle. A first light receiving position that corresponds to a scanning angle immediately before a plurality of light receiving positions has become detectable at the same scanning angle is stored, and a second light receiving position that corresponds to a scanning angle immediately after a plurality of light receiving positions has become undetectable at the same scanning angle is stored too. Then, a first straight line, which is to pass two object positions respectively corresponding to the first light receiving position and another light receiving position to be scanned before said first light receiving position is scanned, and a second straight line, which is to pass two object positions respectively corresponding to the second light receiving position and another light receiving position to be scanned after the second light receiving position is scanned, are obtained to represent the position of the object.

In a more preferable mode, an intersection of the two straight lines is obtained as a bent point of the object.

Still further, in a preferable mode, at least one light receiving position detected by changing a scanning angle of said laser beam is successively stored. The closest scanning angle at which a plurality of light receiving positions, detected at the same scanning angle, approach one another most closely is obtained. A light receiving position of smaller value is selected from among the plurality of light receiving positions as the light receiving position of the primary reflection beam when the scanning angle is less than the closest scanning angle, while one with a larger value is selected from among the plurality of light receiving positions as the light receiving position of the primary reflection beam when the scanning angle is larger than the closest scanning angle.

Yet further, in a preferable mode, the object position is obtained from the light receiving position of the primary reflection beam. A first straight line is obtained on the basis of the object position obtained from the light receiving position of the primary reflection light beam in a scanning angle region from the minimum scanning angle to the closest scanning angle. A second straight line is obtained on the basis of the object position obtained from the light receiving position of the primary reflection beam in a scanning angle region from the closest scanning angle to the maximum scanning angle. A position of a bent point of the object is identified as an intersection point of these first and second straight lines.

Moreover, according to a second mode of the present invention, there is provided a position detecting apparatus for a laser sensor comprising:

a light receiving cell consisting of a CCD that contains a plurality of cells, each to generate an output in accordance with an electric charge stored in proportion to a light quantity received on a cell surface;

a timing signal generator for generating a sample hold signal to successively scan respective cells from the beginning after a gate signal is outputted;

a cell counter capable of being reset by the gate signal and counting the sample hold signals to output a value $x_i$ of cell position in the light receiving element;

an adder capable of being reset by the gate signal for successively adding the output $C_i$ of each cell in the light receiving element to be scanned in response to the sample hold signal to obtain the sum total $\Sigma C_i$;

a sum of products calculating unit capable of being reset by the gate signal for multiplying said output $C_i$ of each cell in the light receiving element to be scanned in response to the sample hold signal by the value $x_i$ of each cell position outputted from the cell counter and successively summing up these multiplied values so as to obtain a summation value $\Sigma C_i \cdot x_i$; and a division unit for dividing said summation value $\Sigma C_i \cdot x_i$, obtained through the sum of products calculating means, by the sum total $\Sigma C_i$, obtained by the adder means, to calculate a center of gravity position $\Sigma C_i \cdot x_i / \Sigma C_i$ of received beams and outputting this center of gravity position as the light receiving position.

Furthermore, in a preferable mode, there are further provided a comparator that compares the output $C_i$ of each cell with a predetermined threshold value $V_s$ and generates an output when the output $C_i$ of each cell is equal to or greater than the predetermined threshold value $V_s$;

a counter capable of being reset in response to the output signal fed from the comparator, counting the cell number to be scanned after the output signal disappears and generating an output signal when the cell number exceeds a predetermined value to reset the adder means, sum of products calculating unit and division unit;

a plurality of latch-buffers capable of being connected in series, respectively transferring stored data to their succeeding buffers in response to the output signal fed from the counter, storing the output fed from the division unit in a first step buffer thereof, and being reset by said gate signal; and a unit for obtaining the light receiving position of the primary reflection beam from the data stored in the plurality of latch buffers.

Still further, in a preferable mode, there are provided a unit for changing a scanning angle of a laser beam in synchronization with the gate signal; a unit for obtaining a first light receiving position at which only one stored data is supplied from the plurality of latch buffers in the beginning of the scanning operation of the laser beam, a second light receiving position corresponding to a scanning angle immediately before a plurality of stored data are available, a third light receiving position corresponding to a scanning angle immediately after a plurality of stored data are no longer available, and a fourth light receiving position at which only one stored data is supplied from the plurality of latch buffers in the end of the scanning operation which constitutes the means for obtaining the light receiving position of the primary reflection beam, and storage unit for storing respective light receiving positions.

Yet, in this mode, there are further provided a unit for obtaining a first straight line to pass the two object positions respectively corresponding to the first and second light receiving positions and a second straight line to pass the two object positions respectively corresponding to the third and fourth light receiving positions, whereby the first and second straight lines are used to identify the object position.

Moreover, in a preferable mode, there is further provided a unit for changing a scanning angle of a laser beam in synchronization with the gate signal, in this mode, and the means for obtaining the light receiving position of the primary reflection beam further includes a storage unit for storing a plurality of light receiving positions supplied from the plurality of latch buffers and a detecting unit for detecting the closest scanning angle at which the plurality of light receiving positions approach most closely one another to detect the light receiving position of the smallest value from the storage unit as a first light receiving position of primary reflection beam in a region from the minimum scanning angle to the closest scanning angle, and also to detect the one with the largest value from the storage unit as a second light receiving position of primary reflection beam in a region from the closest scanning angle to the maximum scanning angle.

Furthermore, in a preferable mode, there are provided a unit for obtaining the object position from the first and second light receiving positions of a primary reflection beam; a unit for obtaining one straight line representing a first object position the primary reflection beam and the other straight line representing a second object position on the basis of the second light receiving position of the primary reflection beam; and a unit for obtaining an intersection of the two straight lines representing the first and second object positions as a point of a bent portion of the object.

As described above, according to the present invention, an output of each cell in the CCD and a position of each cell are multiplied to obtain the sum of products. The obtained sum of products is divided by the sum total of outputs of respective cells to obtain a center of gravity position of the sum of products. This center of gravity position on the light receiving element is obtained as the light receiving position, which will not be adversely affected by a significant size of respective cells that deteriorates the detecting resolution. In other words, the light receiving position obtained by the method according to the present invention is no longer affected by the inferior detecting resolution of the CCD, thereby enabling position detection at a higher accuracy. That is, it becomes possible to realize an accurate detection of the object position by determining the object position on the basis of this light receiving position.

Furthermore, every time an output of a cell exceeds the predetermined threshold value until the output then decreases down below the threshold value until a scanning point reaches a point apart by a predetermined distance, a center of gravity is obtained based on the above-described sum of products and summation value. Thus, a plurality of light receiving positions of the primary reflection beam or secondary reflection beam and the like can independently be detected.

Moreover, in the case where a plurality of light receiving positions are detected at the same scanning angle during a scanning operation in which the scanning angle of the laser beam is changed to detect the light receiving positions, all the stored data that correspond to a plurality of light receiving positions detected at the same scanning angle, i.e., all the stored data, in which the light receiving position of the secondary reflection beam is contained together with the light receiving position of the primary reflection beam, are disregarded. Thus, the object position is rather obtained as an intersection of two loci of shifting laser beam that are calculated on the basis of stored data of only the light receiving position of the primary reflection beam.

Still further, in the case where two or more light receiving positions are detected at the same scanning angle, the scanning angle of the laser beam is divided into two regions by the closest scanning angle where two or more light receiving positions approach one another most closely at the same scanning angle. In each of the divided scanning angle regions, only the light receiving position of the primary reflection beam is chosen based on the largest or smallest value of the light receiving position among a plurality of light receiving positions in order to identify the position of the object.

BEST MODE FOR CARRYING OUT THE INVENTION

Overall Constitution of Laser Sensor

Figure 1:
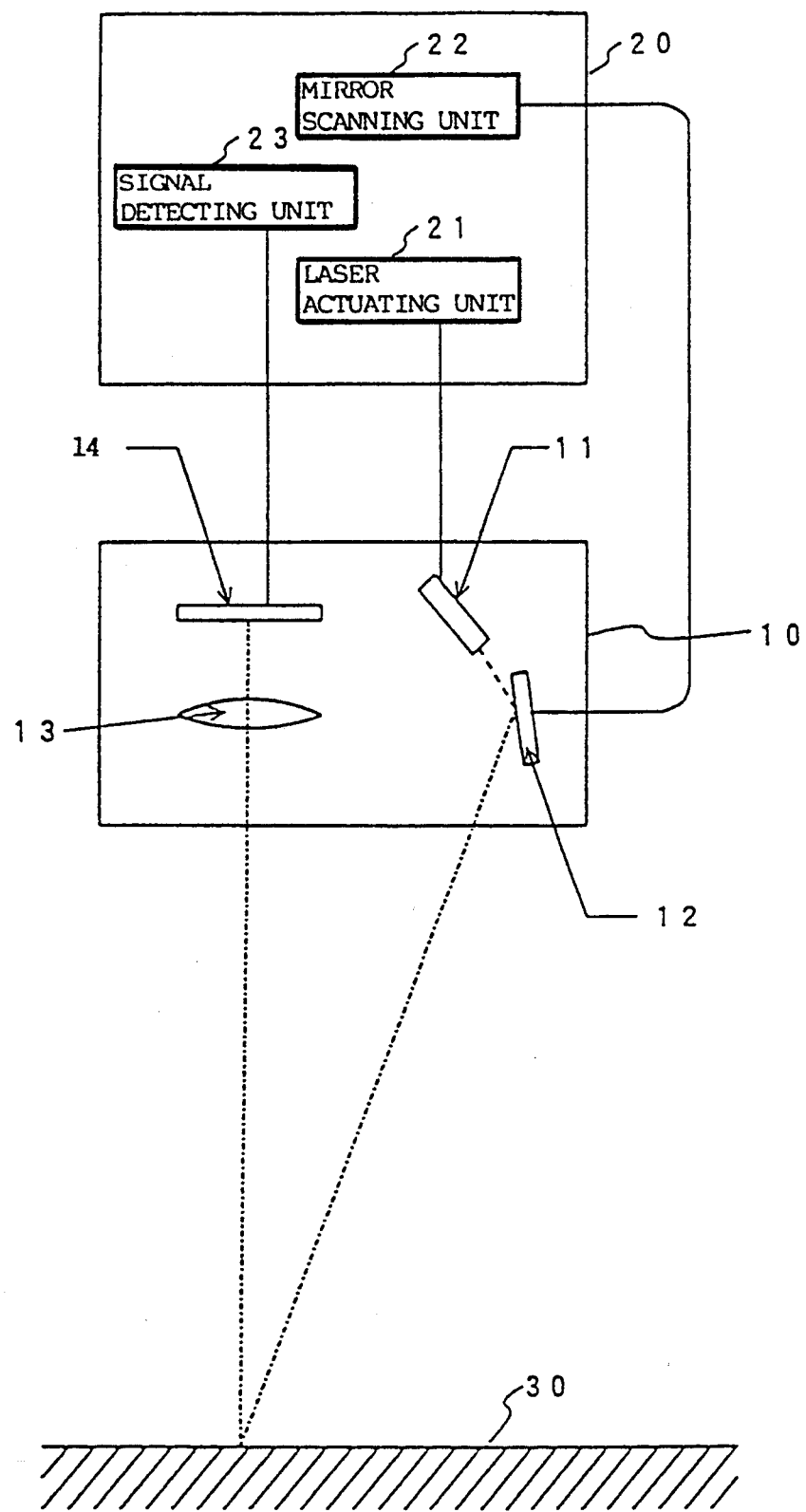
FIG. 1 is a schematic block diagram of a laser sensor.
Figure 2:
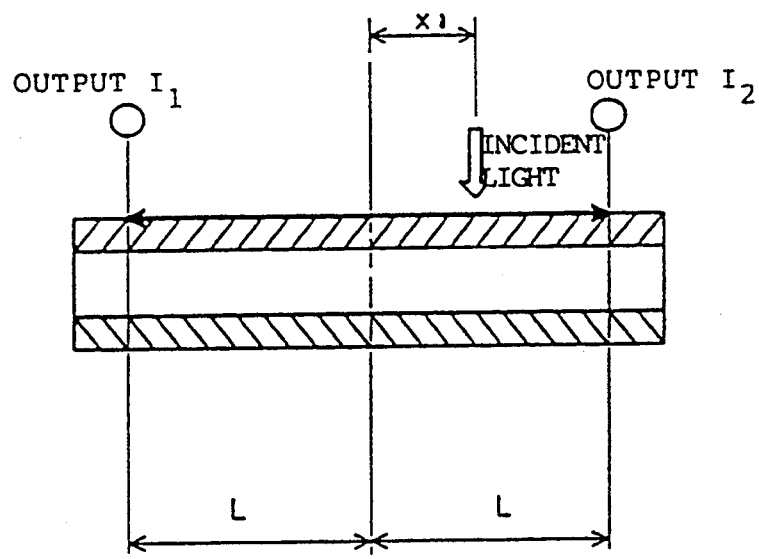
FIG. 2 is an illustrative view showing a calculation of a light receiving position when a PSD is adopted as a light receiving element.
Figure 3:
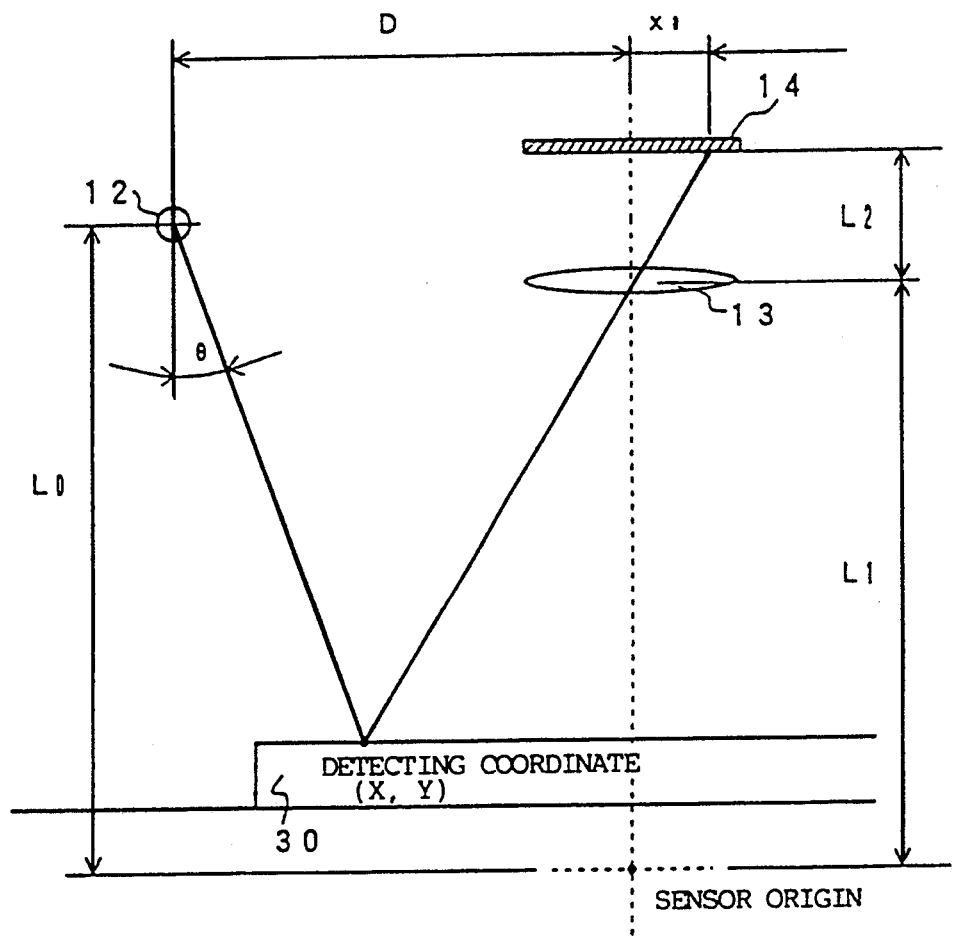
FIG. 3 is an illustrative view for obtaining the position of an object with respect to a light receiving position on the light receiving element.

A laser sensor in accordance with the present invention has almost the same constitution as the conventional laser sensor shown in FIG. 1. This laser sensor also has a CCD adopted as a light receiving element 14, but is different from the conventional one in that a signal detecting unit 23 has a different constitution.

Figure 5:
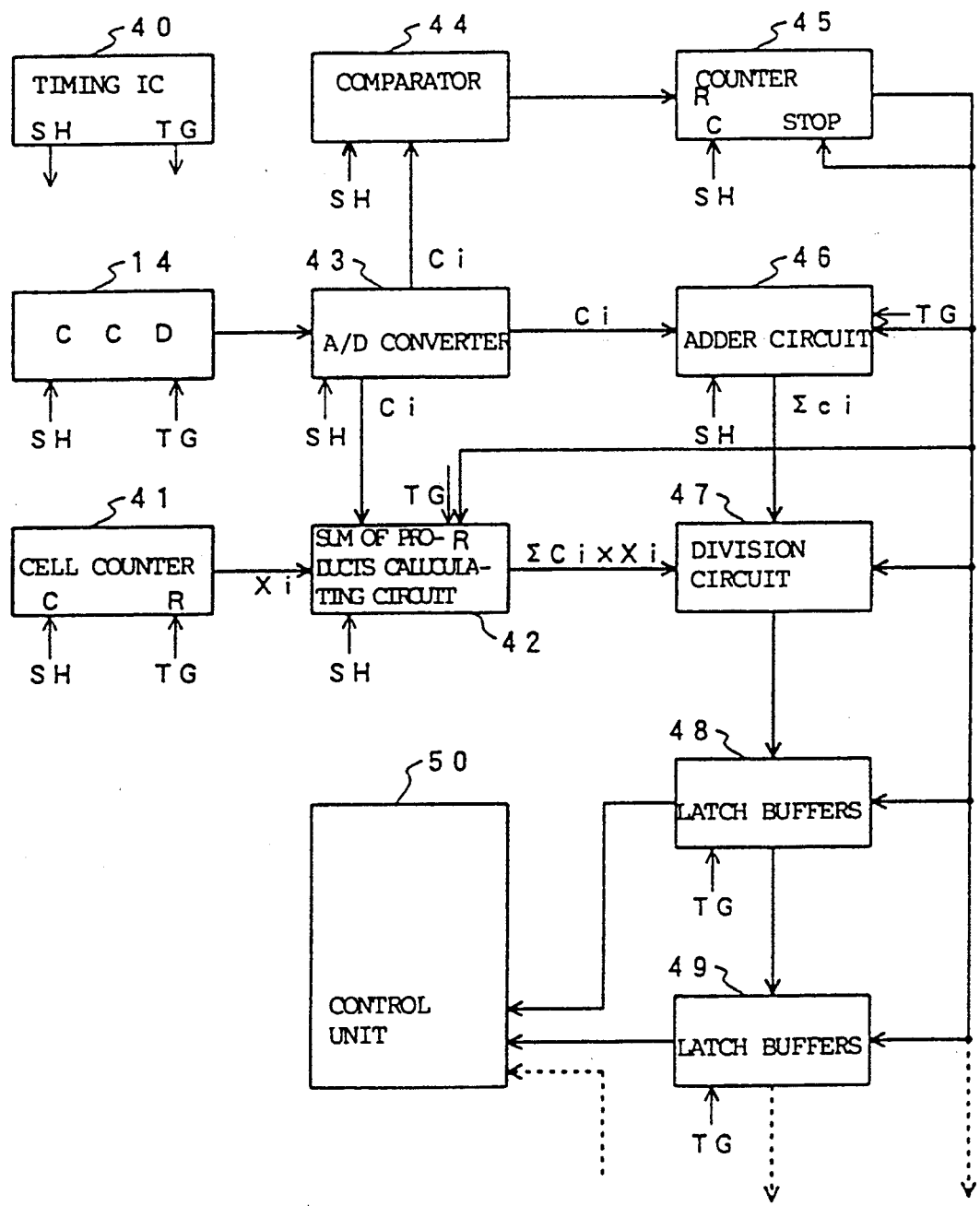
FIG. 5 is a block diagram showing a signal detecting portion in accordance with an embodiment of the present invention.

FIG. 5 is a block diagram of the signal detecting unit 23 in accordance with one embodiment of the present invention. In FIG. 5, a timing IC 40 outputs a sample hold signal SH and a gate signal TG in such a manner that sample hold signals SH are outputted as many as the number of the cells of light receiving element 14 during one period defined by the gate signal TG.

In this embodiment, the light receiving element 14 consists of 1024 cells respectively receiving reflection beam and two groups of 28 optical black cells that are not sensitive to the reflection beam and are respectively located on both sides of the above block of 1024 cells. More specifically, the light receiving element 14 has 1080 cells as a whole, and 1080 pieces of sample hold signal SH are outputted within the duration of one gate signal TG.

The light receiving element 14 comprised of the CCD, designates respective cells successively in response to the above sample hold signals SH, and outputs a voltage corresponding to an electric charge stored in each cell in accordance with the intensity of light received by each cell. This outputted voltage is converted into a digital signal by an A/D converter 43 in synchronization with the sample hold signal SH, and its output $C_i$ is supplied to a later described comparator 44, an adder circuit 46, and a sum of products calculating circuit 42. Here, a suffix i of $C_i$ varies from 1 to the total number of cells. That is, in the above example, it varies from 1 to 1080.

A cell counter 41 is reset in response to the gate signal TG, and counts the number of the sample hold signals SH. A sum of products calculating circuit 42 is used to multiply an output $x_i$ of the cell counter 41 by the output $C_i$ of the A/D converter 43 in response to the sample hold signal SH, and successively add the resulting products. That is, an operation defined by the following equation is carried out.

$$\Sigma C_i \cdot x_i \qquad (4)$$

Furthermore, the sum of products calculation circuit 42 is reset by an output of a later described counter 45 and the gate signal TG.

The comparator 44 compares the output $C_i$ of the A/D converter 43 and a predetermined threshold value $V_s$ in response to the sample hold signal SH, and generates an output to reset the counter 45 when the output $C_i$ exceeds the threshold value $V_s$. The counter 45 counts the sample hold signals SH, and is reset in response to each output signal from the comparator 44. Then, the counter 45 generates an output if its counting value exceeds a predetermined value N, to reset the sum of products calculating circuit 42 and later described adder circuit 46 and division circuit 47, and stops its counting operation, whereas, if the comparator 44 generates an output again, the counter 45 is reset to resume the counting operation.

The adder circuit 48 successively adds the output $C_i$ fed from the A/D converter 43 in response to the sample hold signal SH, supplies its output $\Sigma C_i$ to the division circuit 47, and is reset by the output of the counter 45 and the gate signal TG. The division circuit 47 divides the output $\Sigma C_i \cdot x_i$ of the sum of products calculation circuit 42 by the output $\Sigma C_i$ of the adder circuit 46 to obtain the light receiving position of the light receiving element 14. More specifically, the light receiving position $x_a$ is obtained by determining a center of gravity of the received beam through the following equation:

$$x_a = (\Sigma C_i \cdot x_i) / \Sigma C_i \tag{5}$$

Latch buffers 48 and 49 are connected in series as many as necessary. Although two latch buffers connected in series are usually used to store the information of the primary reflection beam and the secondary reflection beam, the number of latch buffers may be increased depending on the frequency at which the noise light occurs. In response to the output of the counter 45, the latch buffer 48, which stores the position information $x_a$ previously sent from the division circuit 47 transfers this currently stored information $x_a$ to the next latch buffer 49 in order to store a newly outputted light receiving position $x_a$ supplied from the division circuit 47.

Moreover, the latch buffers 48 and 49, supply their stored light receiving positions $x_a$ to a control unit 50 in response to the gate signal TG and, in turn, are reset. The control unit 50 is comprised of a processor, memories and the like, and used to obtain the position of the object through later-described processing. Incidentally, this control unit needs not be provided exclusively and, therefore, any control unit of a welding robot or a sealing robot that is equipped with the laser sensor can be used as the control unit of the position detecting apparatus according to the present invention.

Processing of Position Detecting Signal

An operation of the signal detecting unit 23 shown in FIG. 5 will be explained hereinafter.

Figure 6:
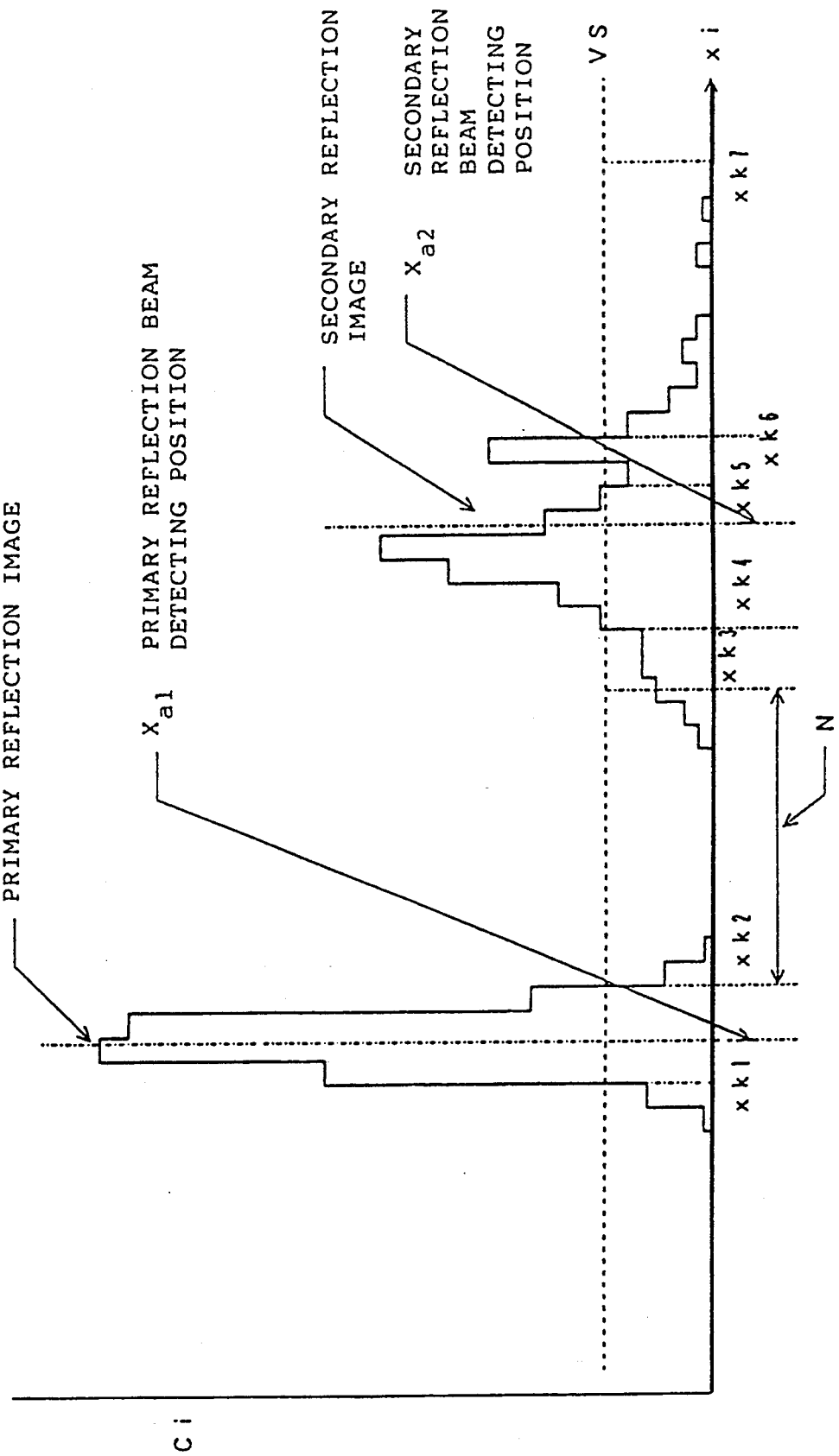
FIG. 6 is a graph showing one example of an output from the light receiving element in the embodiment of the present invention.

It is now supposed, for example, that each cell $x_i$ (i=1 to 1080) of the light receiving element 14 has stored an electric charge $C_i$ as shown in FIG. 6. In FIG. 6, an abscissa represents the cell position (i.e. cell number) $x_i$, and an ordinate the electric charge value $C_i$ memorized in each cell.

First, the timing IC generates the gate signal TG to reset all the elements. Subsequently, every time the sample hold signal SH is outputted, the cell counter 41 counts the sample hold signal SH and outputs its counted value. In other words, the cell counter 41 successively outputs the cell position $x_i$ starting from $x_1$.

On the other hand, the light receiving element 14 responds to each of the sample hold signal SH to successively output a voltage representative of the electric charge stored in the corresponding cell starting from the first cell. The voltage outputted from the light receiving element 14 is converted into the digital signal $C_i$ by the A/D converter 43. The sum of products calculation circuit 42 executes the operation defined by the fourth equation and supplies its result $\Sigma C_i \cdot x_i$ to the division circuit 47. Furthermore, the adder circuit 46 adds the output $C_i$ fed from the A/D converter 43 and supplies its result $\Sigma C_i$ to the division circuit 47. Then, the division circuit 47 executes the operation defined by the equation (5).

Additionally, the comparator 44 compares the output $C_i$ of the A/D converter 43 with the predetermined threshold value $V_s$. Above-described processing is carried out in respective elements every time the sample hold signal SH is generated.

In the example of FIG. 6, when the output $x_i$ of the cell counter 41 becomes $x_{k1}$, and the output $C_i$ of corresponding cell exceeds the threshold value $V_s$, the comparator 44 generates an output to reset the counter 45. When the output $x_i$ of the cell counter 41 becomes $x_{k2}$, and the output $C_i$ of corresponding cell decreases down below the threshold value $V_s$, the comparator 44 stops its output, and the counter 45 initiates to count the number of sample hold signals SH.

Then, it is now supposed that the counting value of the counter 45 exceeds the predetermined value N when the output $x_i$ of the cell counter 41 becomes $x_{k3}$. At this moment, the counter 45 generates an output to stop the counting operation, and also the latch buffer 48 transfers its stored value to the latch buffer 49 to store the output from the division circuit 47 in the latch buffer 48.

Subsequently, the adder circuit 46, the sum of products calculating circuit 42, and the division circuit 47 are all reset. That is, the division circuit 47 executes the operation defined by the fifth equation on the basis of both outputs from the sum of products calculating circuit 42 and the adder circuit 46. As a result, at that point the counter 45 generates the output of gravity position in a region from the cell position $x_1$ to the cell position $x_{k3}$, i.e., the light receiving position $x_{a1}$. Then, this value $x_{a1}$ is stored in the latch buffer 48.

Still further, when the output $x_i$ of the cell counter 41 becomes $x_{k4}$, and the output value of the A/D converter 43 exceeds the threshold value $V_s$, the comparator 44 generates an output to reset the counter 45 again. When the output $x_i$ of the cell counter 41 becomes $x_{k5}$, and the output of A/D converter 43 decreases below the threshold value $V_s$, the comparator 44 stops its output, and the counter 45 resumes counting the number of sample hold signals SH.

However, in the example of FIG. 6, the output of the A/D converter 43 exceeds the threshold value $V_s$ before the counted value of the counter 45 reaches the predetermined value N therefore, the counter 45 is reset again. When the output $x_i$ of the cell counter 41 becomes $x_{k6}$, the output value of the A/D converter 43 decreases down below the threshold value $V_s$, and the counter 45 starts the counting operation. Then, when the output $x_i$ of the cell counter 41 becomes $x_{k7}$, and the counted value of the counter 45 exceeds the predetermined value N, the counter 45 generates an output to stop the counting operation and, at the same time, the light receiving position $x_{a1}$ stored in the latch buffer 48 is transferred into the latch buffer 49, and the output from the division circuit 47 is stored in the latch buffer 48.

Subsequently, the adder circuit 46, the sum of products calculating circuit 42, and the division circuit 47 are all reset. In this case, the sum of products calculation circuit 42 generates a sum of products value $\Sigma C_i \cdot x_i$ from the position $x_{k3}$ that was previously reset, and the adder circuit 46 generates, from the position $x_{k3}$, an output $\Sigma C_i$ corresponding to the sum of output $C_i$ of the A/D converter 43.

Therefore, when the counter 45 generates an output, the division circuit 47 outputs the gravity position in a region from the cell position $x_3$ to the cell position $x_{k7}$, that is, the light receiving position $x_{a2}$. Thus, this value $x_{a2}$ is stored in the latch buffer 48.

Then, if the gate signal TG is outputted, the stored values in the latch buffers 48 and 49 are both supplied to the control unit 50, and the latch buffers 48 and 49 are reset. Also, the sum of products calculating circuit 42, the adder circuit 46 and the cell counter 41 are all reset by the gate signal TG. Accordingly, the scanning operation is resumed from the first cell of the light receiving element 14 to repeat the above-described operation.

First Embodiment of Position Detecting Signal Processing Method

Figure 7:
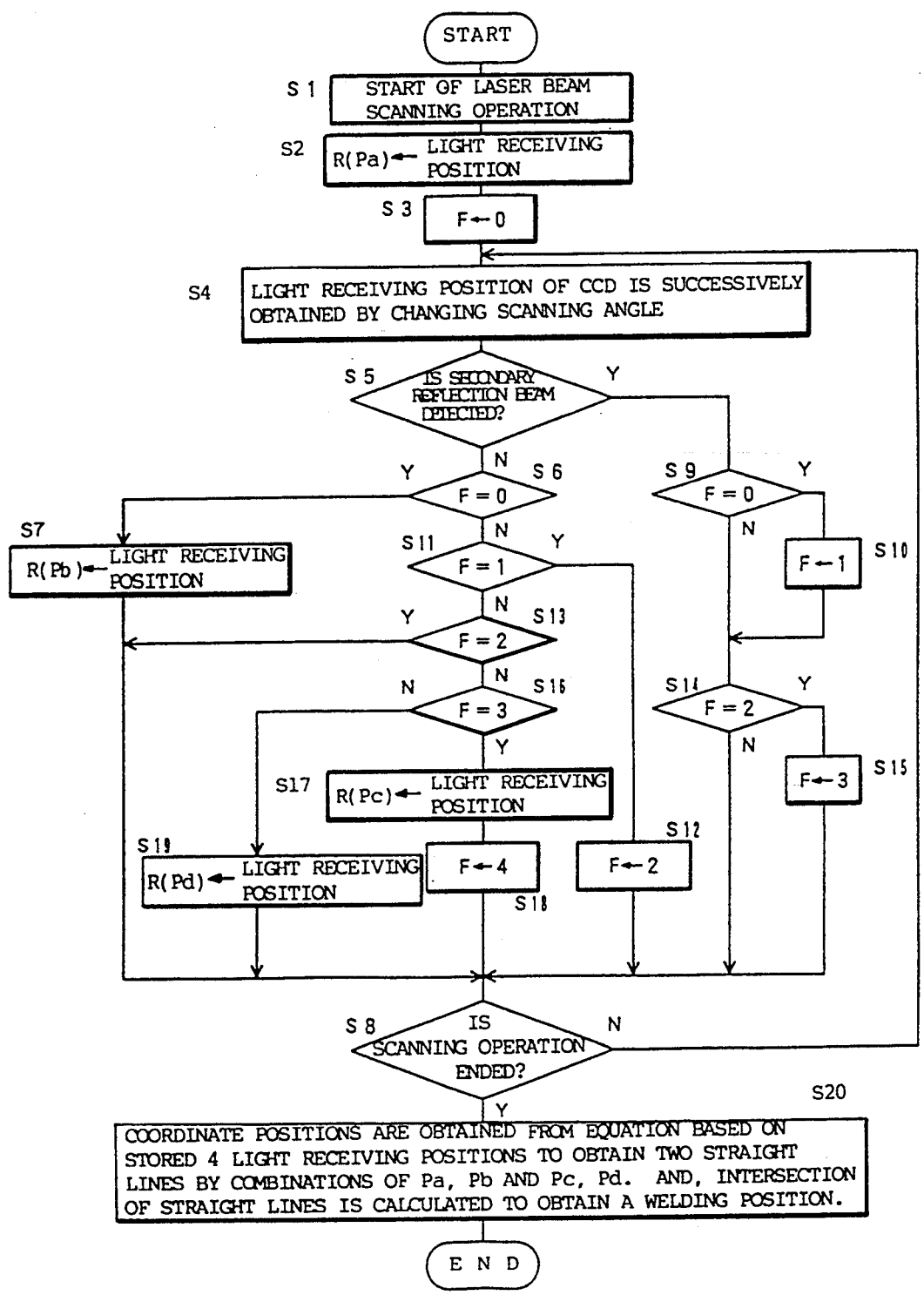
FIG. 7 is a flow chart showing a position detecting processing in accordance with a first embodiment of the present invention that is executed on a processor of a control unit according to the same embodiment.

Next, an operation of the first embodiment of the present invention relating to the processing, which is executed by the control unit 50 to detect the object position, will be explained with reference to a flow chart of the processing to be executed the processor of the same control unit 50 shown in FIG. 7. In this embodiment, the light receiving position is successively detected by changing the scanning angle of the laser beam; both the primary reflection beam position corresponding to the scanning angle immediately before the secondary reflection beam comes to be detected and the primary reflection beam position corresponding to the scanning angle immediately after the secondary reflection beam comes to be not detected are stored; then, the position of the object is detected on the basis of the relationship between these primary reflection beam positions and two light receiving positions, which correspond to the minimum and maximum scanning angles.

First of all, the control unit of the robot accommodating this laser sensor generates a scanning instruction. In the case where the processor of this robot control unit also serves as the control unit of the laser sensor, this processor generates a scanning instruction in accordance with the operation of the robot. In response to the given instruction, the laser actuating unit 21 starts to operate to cause the laser oscillator 11 to emits a laser beam.

Then, the processor outputs a scanning start instruction to the mirror scanning unit 22, as shown in a step S1 of the flow chart. The mirror scanning unit 22 changes the angle of the swing mirror 12 stepwise at a predetermined pitch in response to the gate signal TG until the angle of the swing mirror 12 is adjusted to a predetermined angle. By the way, the scanning angle of the laser beam is determined by the swingable angle of the mirror 12, which is set in such a manner that the swingable limit of the swing mirror 12 in a counterclockwise direction of FIG. 4 corresponds to the minimum scanning angle, and the scanning angle of the laser beam increases as the swing mirror 12 turns in a clockwise direction.

Additionally, in response to the gate signal, the processor reads in the light receiving position $x_{a1}$ and $x_{a2}$ supplied from the latch buffers 48 and 49.

Usually, when the scanning start instruction is generated, the mirror angle is positioned in such a manner that the laser beam can be reflected in one plane of the object 30 without causing the generation of the secondary reflection beam. Therefore, the position $x_a$ fed from the latch buffers 48 and 49 is a data corresponding to the primary reflection beam. For example, in the case of the object 30 shown in FIG. 4, no secondary reflection beam is obtained in the beginning of the scanning operation, and, therefore, only the position data derived from the primary reflection beam is supplied. The processor stores this data into the register R(Pa) as a data obtained at the scanning initiation point as shown in step S2, and a condition storage flag F is set to 0, as shown in step S3.

Figure 4:
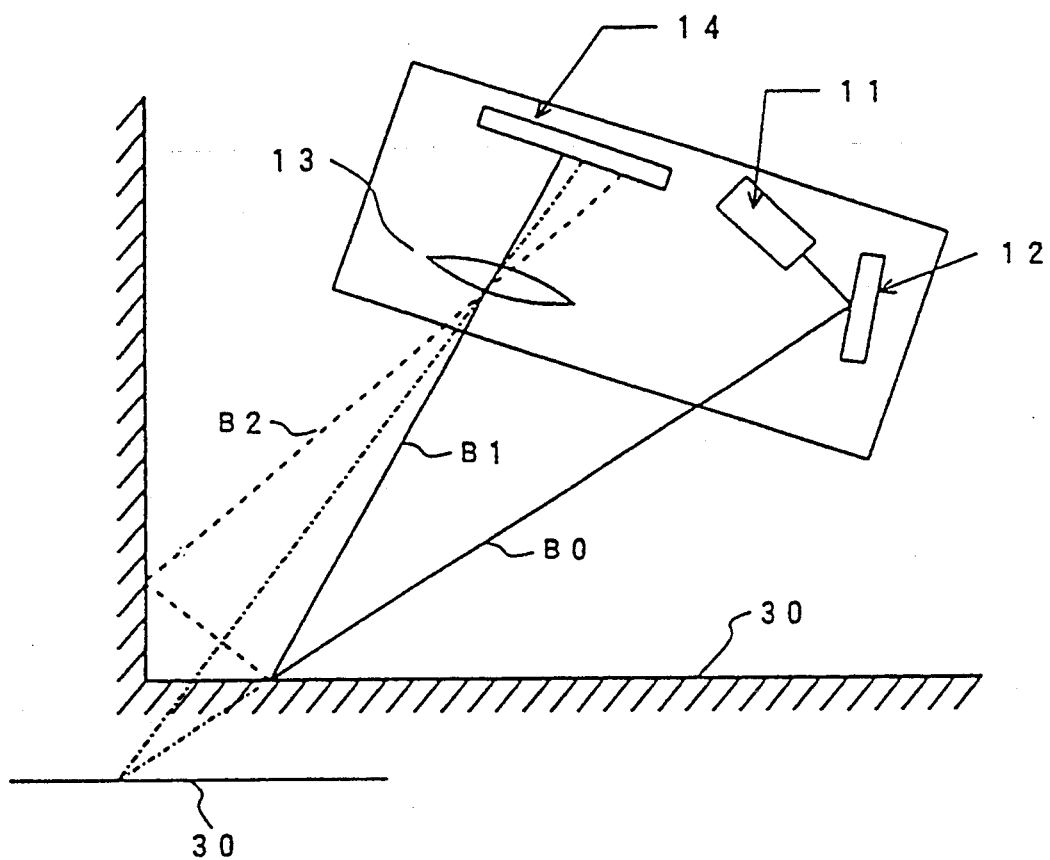
FIG. 4 is an illustrative view showing an interrelation between a secondary reflection beam and the object.
Figure 8:
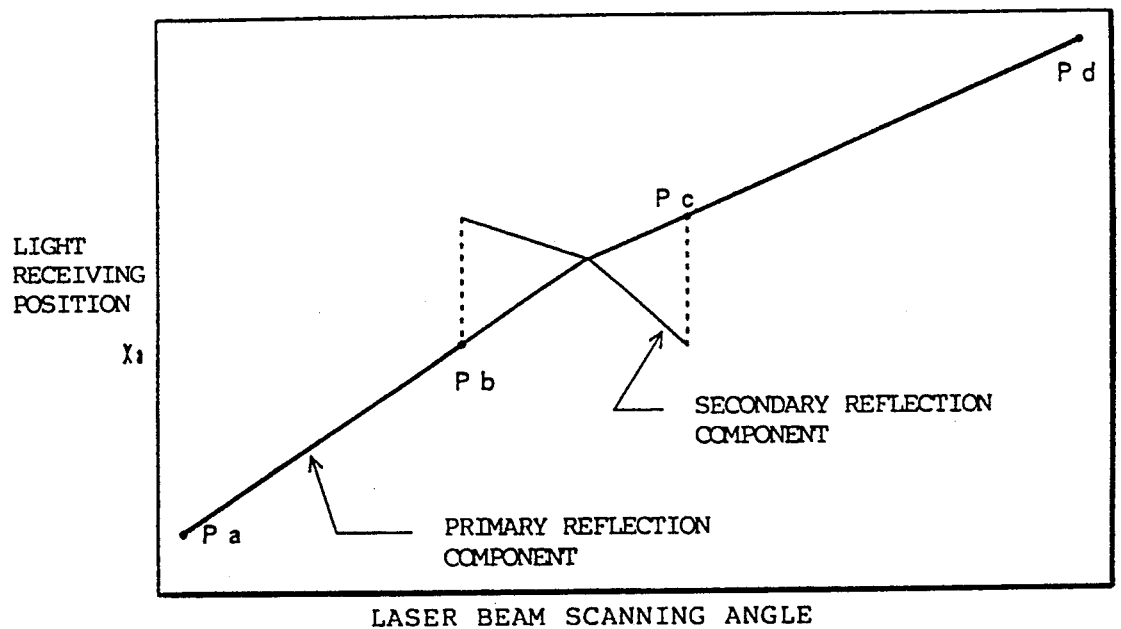
FIG. 8 is an illustrative view showing an example of the light receiving position in accordance with the first embodiment.

FIG. 8 is a view illustrating a relationship of the laser beam scanning angle (i.e. the swing mirror angle) with respect to the object 30 shown in FIG. 4 versus the light receiving position $x_a$ on the light receiving element 14.

In this case, the laser beam is first reflected at a point far from a bent portion to be welded or sealed. Therefore, only a primary reflection beam is generated. Specifically, only one light receiving position $x_a$ on the light receiving element 14 is obtained, and thus, only the data stored in the latch buffer 48 is supplied to the control unit 50.

However, if the laser beam scanning angle increases so that the position irradiated by the laser beam approaches the bent portion on the object 30, the secondary reflection beam comes into existence, whereby the light receiving position increases to two due to the primary reflection beam and the secondary reflection beam, respectively. Thus, two data will be coming from two latch buffers 48 and 49.

Then, in the case where the primary reflection beam and the secondary reflection beam approach very closely or are overlapped each other, the secondary reflection beam appears to disappear momentarily. Accordingly, at this moment, it becomes only one data is supplied from the latch buffer 48. As the scanning angle increases further, however, the primary reflection beam and the secondary reflection beam separate from each other again, and, therefore, two light receiving positions will once again be detected.

As the scanning angle is increased further, the position on the object where the laser beam is received and reflected is shifted far away from the bent portion, and thus the secondary reflection beam will no longer appear. Consequently only one light receiving position will be obtained.

Accordingly, the processor stores one light receiving data, which is supplied at the point at which the scanning operation is initiated, into the register R(Pa). In the example of FIG. 8, this light receiving position is shown as Pa, and this position Pa is stored in the register R(Pa).

Subsequently, every time the gate signal TG is outputted, the mirror scanning unit 22 causes the swing mirror 12 to swing by one pitch. The processor is synchronized with the gate signal TG to selectively and repeatedly execute the processing described in steps S4 to S19 every time the scanning angle of the laser beam is changed.

First, in a stage immediately after the start of the scanning operation, only one reflection component is obtained, and the condition storage flag F is equal to its initial value 0. Moreover, since the scanning angle of the laser beam has not yet reached the maximum scanning angle, the processor in the control unit 50 executes the processing defined in the step S4. More specifically, in response to the change of scanning angle of the laser beam, the data stored in the latch buffer 48 is read out, and the processing defined by the steps S5 to S8 is executed repeatedly so that the light receiving position data of the primary reflection beam at the latest scanning angle is stored in the register R(Pb) to renew its stored data corresponding to the latest scanning angle, as shown in step S7.

Then, when the laser beam position on the object 30 shifts toward the bent portion until the secondary reflection beam appears, two data will be supplied from the latch buffers 48 and 49. In this case, the processor in the control unit 50 judges the beam to be the secondary reflection beam in the step S5. After executing the judgement processing in step S9, the processor sets the condition storage flag F to 1, as shown in a step S10, and executes judgement processing in the steps S14 (a processing for judging whether or not the flag F is set to "2") and S8. Then, the processing returns to the step S4.

At this point, the data stored in the register (Pb) is the value of the latch buffer 48 corresponding to the scanning angle immediately before the secondary reflection beam is detected, that is, the light receiving position data of the register (Pb) shown in FIG. 8 (the first light receiving position).

The condition storage flag F is set to 1 when the secondary reflection beam is detected. Therefore, in the succeeding scanning angles, the processing defined by the steps S5, S9, S14 and S8 are repeatedly executed, every time the scanning angle of the laser beam varies in executing the processing in step S4 such that the scanning angle of the laser beam is changed stepwise.

Additionally, as the laser beam position on the object 30 approaches the bent portion, the secondary reflection beam position on the object 30 also gradually approaches the bent portion from the opposite direction, as shown in FIG. 8.

When the primary reflection beam and the secondary reflection beam approach each other very closely, it is not always easy to distinguish the first reflection beam from the secondary reflection beam, and vice versa, depending on the set value Vs or setting of N. Therefore, the judgement may be made as if the secondary reflection beam is non-existent. Also, when a pitch of the scanning angle is extremely small, such confusing cases may occur more than a few times. (Refer to an intersection of the primary reflection component and the secondary reflection component in FIG. 8)

In such a case, as only one data is supplied from the latch buffer 48, the processor that repeatedly executes the processing defined in the steps S4, S5, S9, S14 and S8 will judge, in step S5, that the secondary reflection beam is not detected and, consequently, will proceed to S6. In this case, as the condition storage flag F is already set to 1, the processor proceeds to the step S12 to set the condition storage flag F to 2 after having executed the judgement in the step S11. Then, the processor executes the judgement processing in the step S8 and returns to the step S4 again.

When the discrimination between the primary reflection beam and the secondary reflection beam cannot be made, and when the secondary reflection beam has disappeared momentarily, the result of judgement in step 5 will become FALSE, but the processings defined in steps S4, S5, S6, S11, S13 and S8 will be repeatedly executed, since the value of condition storage flag is 2.

When the scanning angle of the laser beam is further increased to enable the primary reflection beam and the secondary reflection beam to be discriminated from each other, two data will become available again from the latch buffers 48 and 49. In this condition, the processor in the control unit 50 will judge in the step S5 that the secondary reflection beam is existing, and, in turn, proceed to step S15 to set the condition storage flag F to 3 after having executed the processing in the steps S9 and S14. Then, the processor again returns to the step S4 after having executed the judgement processing in the step S8.

As the value of the condition storage flag F is 3 as long as the secondary reflection beam is detected, the processor repeatedly executes the processing of the steps S4, S5, S9, S14 and S8 in the succeeding scanning angles.

If the primary reflection beam and the secondary reflection beam are so far apart that the secondary reflection beam is no longer detected, the judgement in the step S5 turns to NO. In this case, the processor executes the judgement processing in the steps S6, S11, S13 and S16, and proceeds to step S17. In the step S17, the processor stores a light receiving position data corresponding to the latest scanning angle, i.e. a value stored in the latch buffer 48 that corresponds to the scanning angle immediately after the secondary reflection beam has not been detected. More specifically, the light receiving data indicated by Pc in FIG. 8 is stored in the register R(Pc). Furthermore, the processor sets the condition storage flag F to 4 in step S18, executes the judgement processing in the step S8, and subsequently returns to the step S4.

As the value of the condition storage flag F is 4 at this moment, the secondary reflection beam is no longer detected in the succeeding scanning angles. The processor repeatedly executes the judgement processing of steps S4, S5, S6, S11, S13 and S16, a processing in a step S19 and the judgement processing of step S8. Specifically, the latest value in the latch buffer 48 is stored in the register R(Pd) one after another, corresponding to the scanning angle in the processing of step S19 so as to renew the value previously stored in the register.

Accordingly, when the scanning angle reaches the maximum angle, and the judgement in the step S8 is the register R(Pd) stores the light receiving position of the primary reflection beam corresponding to the maximum scanning angle; i.e. the data of Pd in FIG. 8.

The registers R(Pa)—R(Pd) respectively store the light receiving positions of primary reflection beams. When the laser beam moves on the plane of the object in accordance with the swing motion of the swing mirror 12, the light receiving position at which the reflected beam is received varies linearly on the light receiving element. More specifically, the register R(Pa) stores the first light receiving position Pa of the primary reflection beam that is reflected back at a point far from the bent portion of the object. The register R(Pb) stores the light receiving position Pb of the primary reflection beam that is located close to the bent portion and corresponds to the scanning angle immediately before the secondary reflection beam become detectable. Therefore, a straight line passing both the light receiving positions Pa and Pb coincides with the straight line of the light receiving position generated when the laser beam moves on one plane of the object.

In the same manner, a straight line passing the light receiving positions Pc and Pd stored in the registers R(Pc) and R(Pd) coincides with the straight line of the light receiving position generated when the laser beam moves on the other plane of the object. Then, a position where these two straight lines intersect represents the light receiving position corresponding to the bent portion of the object.

Accordingly, the processor executes the second and third equations with respect to the positions Pa, Pb, Pc and Pd stored in respective registers R(Pa), R(Pb), R(Pc) and R(Pd) to obtain coordinate positions $(X_a, Y_a)$, $(X_b, Y_b)$, $(X_c, Y_c)$, and $(X_d, Y_d)$ corresponding to respective positions. Then, equations of these two straight lines are obtained on the basis of the combination of $(X_a, Y_a)$, $(X_b, Y_b)$ and $(X_c, Y_c)$, $(X_d, Y_d)$, respectively. Additionally, an intersection of these obtained two straight lines is obtained. This intersecting point coincides with the bent portion, and, therefore, is determined as a welding or sealing point, as shown in step S20.

The above-described operation is for detecting of only one welding or sealing point. However, in the case where the welding or sealing position is to be continuously detected, the swing direction of the swing mirror 12 is reversed after completing the processing of step S20, and the processing starting from the step S1 is repeatedly executed. In this case, the register R(Pa) stores the light receiving position Pd in FIG. 8, and the register R(Pb) stores the light receiving position Pc. Further, the register R(Pc) stores the light receiving position Pb, and the register R(Pd) stores the light receiving position Pa, respectively.

Second Embodiment of Position Detecting Signal Processing Method

A second embodiment of the present invention will now be explained with reference to the flow chart shown in FIGS. 9 and 10. In this second embodiment, the closest scanning angle is obtained. This closest scanning angle is defined as a scanning angle at which two light receiving positions of the primary reflection beam and the secondary reflection beam at the same scanning angle most closely approach each other. The closest scanning angle is used to separate the light receiving position data into the data relating to the primary reflection beam and the data relating to the secondary reflection beam. Thus, only the light receiving positions relating to the primary reflection beam are picked up.

In this embodiment, the minimum scanning angle corresponds to an original position of the swing mirror 12, while the maximum scanning angle corresponds to a maximum swingable angle of the swing mirror 12 measured from the original position.

Respective components in the laser sensor and the object 30 are the same as those disclosed in the first embodiment. In other words, this second embodiment is different from the first embodiment only in that the processor in the control unit 50 functions differently.

Figures 11, 12, 13:
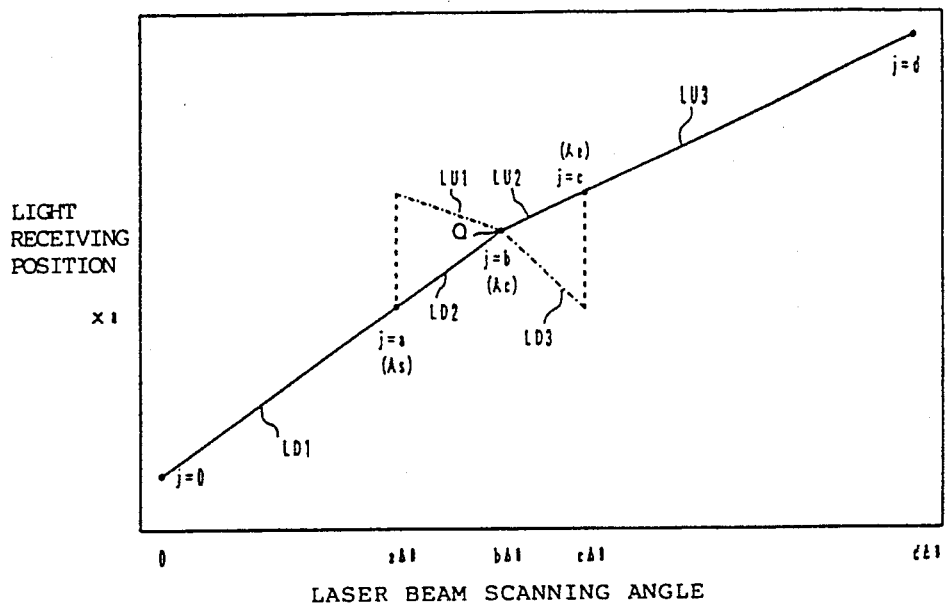
FIG. 11 is an illustrative view showing one example of the light receiving position in accordance with the second embodiment.
FIG. 12 is an illustrative view schematically showing arrayed light receiving position data stored in respective registers in accordance with the second embodiment; and, FIG. 13 is an illustrative view schematically showing arrayed light receiving data of primary reflection beam stored in respective registers in accordance with the second embodiment.

The relationship of the laser beam scanning angle (i.e. the swing mirror angle) with respect to the object 30 versus the light receiving position $x_a$ is newly shown in FIG. 11.

Figure 9:
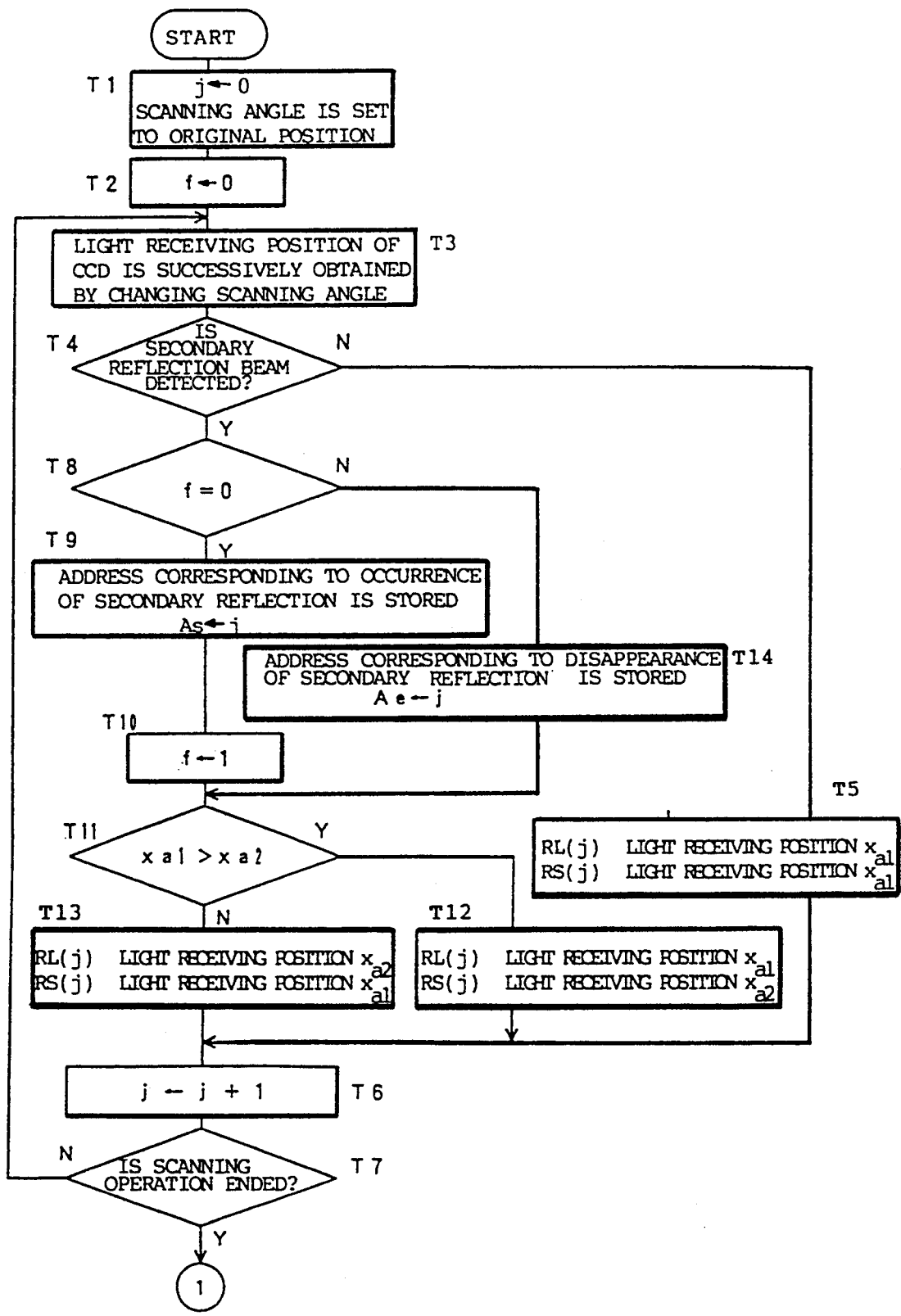
FIG. 9 is a flow chart showing a position detecting processing in accordance with a second embodiment of the present invention that is executed on the processor of the control unit according to the first embodiment.

In the processing shown in FIG. 9, the processor first initializes an address index j, as shown in step T1, and sets the condition memorizing flag f to 0, as shown in a step S2.

Subsequently, the processor proceeds to step T3 to read in light receiving data from the latch buffers 48 and 49. However, as there is no secondary reflection beam immediately after the scanning operation is just started, only the data $x_{a1}$ is inputted from the latch buffer 48. Accordingly, a judgement result in step T4 becomes NO. Thus, the processor proceeds to step T5 to store the light receiving position $x_{a1}$ read out from the latch buffer 48 into two registers RL(j) and RS(j) respectively, with the address j provided in the RAM and the like of the control unit.

These two registers RL(j) and RS(j) store light receiving positions corresponding to the scanning angle of the swing mirror 12. More specifically, each of these registers RL(j) and RS(j) stores the light receiving position corresponding to the scanning angle equal to a pitch angle $\Delta\theta$ multiplied by j.

After storing the light receiving position data, the processor proceeds to step T6 to increment the address index j, and further proceeds to step T7 to judge whether or not the scanning angle of the swing mirror 12 has reached the maximum scanning angle. As the scanning angle has not reached the maximum scanning angle, it returns to the step T3.

In the succeeding scanning operation, as long as the judgement result becomes NO in the step T4, the processor repeatedly executes the processing in the steps T5 to T7 every time a light receiving position data is newly inputted in response to the change of swing angle of the swing mirror 12 in the step T3. Thus, a light receiving position data $x_{a1}$ of primary reflection beam with respect to the new scanning angle $j\Delta\theta$ is stored in the register RL(j) and RS(j).

Accordingly, in the example of FIG. 11, each of the light receiving position data $x_{a1}$ of primary reflection beam respectively corresponding to each of the scanning angle 0 to $a\Delta\theta$ will be stored in a register having the corresponding address (0−a for each), i.e. in each one of the registers RL(0) to RL(a) and in each of the registers Rs(0) to Rs(a).

The light receiving position data stored in the registers RL(0) to RL(a) and the registers RS(0) to RS(a) become elements for tracing a shifting locus LD1 of the primary reflection beam on the light receiving element 14 as shown in FIG. 11.

If the scanning angle exceeds $a\Delta\theta$, and the secondary reflection beam is generated, two light receiving position data $x_{a1}$ and $x_{a2}$ come to be inputted from both the latch buffers 48 and 49, and the judgement result turns to YES in the step T4. Then, the processor proceeds to the step T8 to judge whether or not the condition storage flag f is 0.

More specifically, this condition storage flag f is used to check whether or not the secondary reflection beam is detected for the first time. As the condition storage flag f is 0 at this moment, this means that the secondary reflection beam is detected for the first time. Therefore, the processor proceeds to step T9 to store a present value of the address index j in a register $A_s$ that stores the address of the position where the secondary reflection beam occurred, and further goes to step T10 to set the condition storage flag f to 1. In the example of FIG. 11, the register $A_s$ stores a+1 since the secondary reflection beam is generated for the first time after the scanning angle exceeds $a\Delta\theta$.

Subsequently, the processor proceeds to step T11 to compare the light receiving position data $x_{a1}$ fed from the latch buffer 48 with the light receiving position data $x_{a2}$ fed from the latch buffer 49. The larger one of these light receiving position data $x_{a1}$ and $x_{a2}$ is stored in the register RL(j) and the smaller one of these light receiving position data $x_{a1}$ and $x_{a2}$ is stored in the register RS(j) in step T12 or step T13.

Further, the processor goes to the step T6 to increment the address index j, and, in turn, goes to the step T7 to judge whether or not the scanning angle of the swing mirror 12 has reached the maximum scanning angle. As the scanning angle has not reached the maximum scanning angle yet at this moment, the processor returns to the step T3.

In the succeeding scanning operation, as long as two light receiving position data $x_{a1}$ and $x_{a2}$ of primary reflection beam and secondary reflection beam are supplied from the latch buffers 48 and 49, the judgement result becomes YES in the step T4. However, as the condition storage flag f is already set to 1, the judgement result becomes NO in the step T8 this time.

Accordingly, each time a new light receiving position data is inputted following the change of swing angle of the swing mirror 12, the processor proceeds to step T14, after finishing the judgement processing in the step T8, to renew the present value of address index j stored in register Ae, which is for storing the position where the secondary reflection beam has disappeared. Then, the processor proceeds to the step T11 to compare the light receiving position data $x_{a1}$ fed from the latch buffer 48 with the light receiving position data $x_{a2}$ fed from the latch buffer 49 to store the larger of these light receiving position data $x_{a1}$ and $x_{a2}$ in the register RL(j), and the smaller one of the light receiving position data $x_{a1}$ and $x_{a2}$ is stored in the register RS(j) in the step T12 or the step T13.

Further, the processor goes to the step T6 to increment the address index j, goes further to the step T7 to execute the judgement processing, and returns to the step T3 again.

As long as the judgement result is YES in the step T4, the processor repeatedly executes the above-described processing every time the scanning angle of the swing mirror 12 is changed stepwise to input a new light receiving position data.

However, if the primary reflection beam and the secondary reflection beam approach each other very closely at the scanning angle $b\Delta\theta$ as shown in FIG. 11, discrimination of two reflection beams may become impossible. In such a case, only the light receiving data $x_{a1}$ is supplied from the latch buffer 48. Therefore, the judgement result in the step T4 turns to NO in this instance. And then, the light receiving data $x_{a1}$ fed from the latch buffer 48 is stored in both of the registers RL(j) and RS(j) in the step T5.

Subsequently, when the primary reflection beam and the secondary reflection beam further shift to depart from each other until they become distinguishable, the judgement result in the step T4 becomes YES. Therefore, the processor re-starts to renew the present value of the address index j and store it in the register Ae that serves to store the position where the secondary reflection beam disappears. Then, the light receiving position data having a larger value is stored successively in the register RL(j), and the light receiving position data having a smaller value is stored in the same way in the register RS(j).

In the example shown in FIG. 11, the address index j of $c-1$ is finally stored in the register Ae that stores the position where the secondary reflection beam disappears, because the secondary reflection beam is no longer detected after the scanning angle reaches $c\Delta\theta$.

As the secondary reflection beam is no longer detected after the scanning angle of the swing mirror 12 reaches $c\Delta\theta$, the processor repeatedly executes the processing in the step T5 in response to every detection of primary reflection beam so that the light receiving position $x_{a1}$ of primary reflection beam can be successively stored in both of the registers RL(j) and RS(j) until the scanning angle of the swing mirror 12 reaches the maximum scanning angle.

When the scanning angle of the swing mirror 12 becomes the maximum scanning angle $d\Delta\theta$ to change the judgement result of the step T7 to YES, the processor proceeds to a new step T15.

FIG. 12 is an illustrative view schematically showing the light receiving data stored in the registers RL(0) to RL(d) and the registers RS(0) to RS(d) through the above-described processing.

As can be understood from FIGS. 11 and 12, the light receiving position data stored in the registers RS(a+1) to RS(b−1) become elements for tracing a shifting locus LD2 of primary reflection beam on the light receiving element 14. The light receiving position data stored in the registers RL(a+1) to RL(b−1) become elements for tracing a shifting locus LU1 of secondary reflection beam on the light receiving element 14.

Further, the light receiving position data stored in the registers RS(b+1) to RS(c−1) become elements for tracing a shifting locus LD3 of the secondary reflection beam on the light receiving element 14. The light receiving position data stored in the registers RL(b+1) to RL(c−1) become elements for tracing a shifting locus LU2 of primary reflection beam on the light receiving element 14.

Moreover, the light receiving position data stored in the registers RL(b) and RS(b) are elements common to the primary reflection beam shifting loci LD2 and LU2, the secondary reflection beam shifting loci LU1 and LD3.

As a resolution for discriminating the primary reflection beam and the secondary reflection beam is dependent on the threshold value $V_s$ or the predetermined value N, the region where the primary reflection beam and secondary reflection beam are not always overlapped at only one point. Therefore, the same light receiving position data $x_{a1}$ can be stored in a plurality of registers such as the registers RL(b) and RL(b+1), or RS(b) and RS(b+1).

As the generation of the secondary reflection beam will not be detected before the scanning angle of the swing mirror 12 reaches $a\Delta\theta$, and after the scanning angle of the swing mirror 12 reaches $c\Delta\theta$, the registers RL(0) to RL(a) and RS(0) to RS(a) store elements for tracing a shifting locus LD1 of the primary reflection beam on the light receiving element 14, whereas the registers RL(c) to RL(d) and RS(c) to RS(d) store elements for tracing a shifting locus LU3 of the primary reflection beam on the light receiving element 14.

In this manner, after having finished all the detecting operations for all the scanning angles, the processor of the control unit goes to the step T15 in order to initiate a processing for detecting the closest scanning angle where two light receiving positions of the primary reflection beam and secondary reflection beam come the closest to each other.

After having proceeded to the step T15, the processor sets both the register $A_c$, which stores the address corresponding to the closest scanning angle, and the address index j to the value of the register $A_s$, which stores the position where the secondary reflection beam appears. Further, in accordance with a value of this address index j, the processor calculates a difference between the light receiving positions of the primary reflection beam and the secondary reflection beam at the position where the secondary reflection beam comes into existence. The obtained difference value is stored in a minimum value storage register W as its initial value, as shown in step T16. In this instance, a value of the index j is $A_s$ that corresponds to a scanning angle $(a+1)\Delta\theta$ in FIG. 11.

Next, the processor of the control unit increments the value of index j for correspondence to the following scanning angle $(a+2)\Delta\theta$ as shown in a step T17. Then, the processor goes to step T18 to judge whether or not the value of address index j reaches the value of register $A_e$ that stores the position where the secondary reflection light disappears.

If the address index j has not reached the value yet, the processor calculates a difference between the light receiving position of the primary reflection beam and the light receiving position of the secondary reflection beam at this scanning angle. Then, it is judged whether or not the obtained difference is smaller than or equal to the present value of minimum value storage register W, as shown in a step T19.

In this case, if the obtained difference is smaller than or equal to the present value of minimum value storage register W, this difference value is stored in the minimum value storage register W to renew its stored value, as shown in a step T20. Also, the present value of index j is stored in the register $A_c$ to renew its stored value, as shown in a step T21.

On the other hand, if the difference value obtained in the step T19 is larger than the present value of minimum value storage register W, the minimum value storage register W and the register $A_c$ will be left intact. Then, the processor returns to the step T17 again, and, in turn, increments the value of index j. On the basis of a renewed value of index j, the processor repeatedly executes the processing of the step 18 and succeeding steps.

As long as the value of address index j has not reached the value of register $A_e$, which stores the position where the secondary reflection beam disappears (step T18), the processor in the control unit repeats the above-described processing. Moreover, the difference between the light receiving position of the primary reflection beam and the light receiving position of the secondary reflection beam is successively calculated. Additionally, every time the calculated value becomes smaller than or equal to the minimum value already stored in the minimum value storage register W, the register $A_c$ is renewed by a value of the address index at corresponding scanning angle.

Accordingly, the register $A_c$ stores, as an address at the closest scanning angle, an address corresponding to the scanning angle where the difference between the light receiving position of the primary reflection beam and the light receiving position of the secondary reflection beam becomes minimum in the scanning angle region between $(a+1)\Delta\theta$ and $(c-1)\Delta\theta$ such that the primary reflection beam and the secondary reflection beam are detected simultaneously.

In the example of FIG. 11, the difference between the light receiving position of the primary reflection beam and the light receiving position of the secondary reflection beam becomes a minimum value 0 when the scanning angle is $b\Delta\theta$. Therefore, the register $A_c$ stores the value of address b. However, in the case where the discrimination of two reflection beams becomes temporarily impossible a plural number of times, the minimum value continues to be 0 during this period of time. Therefore, an address present immediately before the discrimination of two reflection beams is restored, will be stored in the register $A_c$. If the judgement standard in the step T19 is set to $|RL(j)-RS(j)| < W$, an address of the position where the discrimination of the two reflection beams has become impossible for the first time will be stored in the register $A_c$.

After having detected the address register $A_c$ of the closest scanning angle in this manner, the processor identifies the smaller light receiving position data RS(j) as the light receiving position data of the primary reflection beam in the region from the 0 address that corresponds to the minimum scanning angle to the $A_c$ (=b) address that corresponds to the closest scanning angle, while the larger light receiving position data RL(j) will be identified as the light receiving position data of the primary reflection beam in the region from the $A_c$ (=b) address to the d address that corresponds to the maximum scanning angle. (See step T22)

FIG. 13 is a view illustrating an arrayed condition of the light receiving position data identified by the processor. The smaller light receiving position data RS(j), corresponding to the address indexes j=0−b, become elements for tracing the shifting loci LD1 and DL2 of the primary reflection beam on the light receiving element 14 in FIG. 11. On the other hand, the larger light receiving position data RL(j) corresponding to the address indexes j=b−d become elements for tracing the shifting loci LU2 and LU3 of the primary reflection beam.

The processor in the control unit executes the second and third equations with respect to respective light receiving position data of the primary reflection beam stored in respective registers to calculate each coordinate position $(X_j, Y_j)$ of the object corresponding to each light receiving position. Then, the processor stores these coordinate position data as cross-sectional position data of the object, as shown in step T23. Furthermore, two straight lines are obtained by applying a linear interpolation to the coordinate position $(X_j, Y_j)$ of the object in each of regions j=0−b and j=b−d. Then, an intersection of these obtained two straight lines is calculated to obtain the bent portion of the object.

The above-described second embodiment operates at higher accuracy than the first embodiment, since the adverse effect caused by disturbance can be suppressed since only the light receiving position data of primary reflection beam is chosen from the plurality of light receiving data stored corresponding to the same scanning angle, and the bent portion is obtained after finishing the calculation of the coordinate position of object for every scanning angle.

Figure 10:
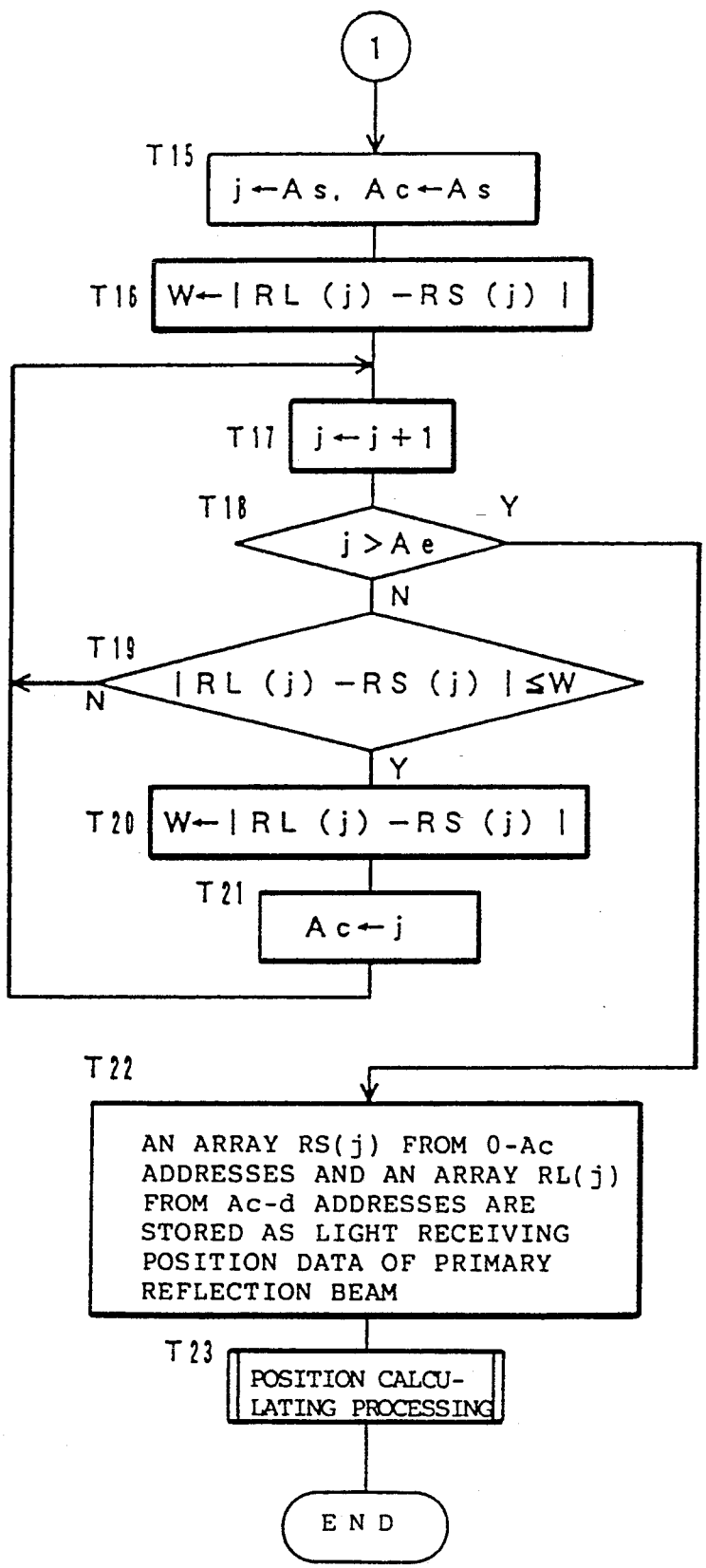
FIG. 10 is a flow chart showing the remainder of the position detecting processing in accordance with the second embodiment of the present invention that is executed on the processor of the control unit according to the first embodiment.

Moreover, although the foregoing description of the position detecting operation shown in FIGS. 9 and 10 is concerned with a case of processing where the swing mirror 12 is turned from its original position toward the maximum scanning angle, the position detecting operation can also be carried out similarly even in the case where the swing mirror 12 is reversely turned from the maximum scanning angle (i.e. the swingable limit) to the original position. However, the latter case differs from the former case in that the address maximum value d will be set as the address index j in the processing of step T1; the address index j will be decremented in the processing of step T6; the judgement standard in the step T7 will be changed to the minimum scanning angle; the value of index j will be stored in the register $A_e$ in the step T9; and the value of index j will be stored in the register $A_s$ in the step T14.

Accordingly, regardless of whether the swing mirror 12 is turned from the original position toward the maximum position or from the maximum position toward the original position, values stored in respective registers at the start of the processing of step T15 are identical in both cases as long as the scanning operation is carried out with respect to the same object.

In the case of the position detecting method according to the present invention, the object position can be detected with higher resolution compared with the conventional detecting method using a CCD as a light receiving element. Moreover, it becomes possible to eliminate detection error due to noise lights such as secondary reflection beams.

What is claimed is:

1. A position detecting apparatus for a laser sensor comprising:
   a light receiving cell consisting of a Charged Coupled Device that contains a plurality of cells, each generating an output $C_i$ in accordance with an electric charge stored in proportion to a light quantity received on a cell surface;
   timing signal generating means for generating a gate signal and generating a sample hold signal to successively scan respective cells from the beginning after the gate signal is outputted;
   cell counter capable of being reset by said gate signal, for counting said sample hold signals to output a value $x_i$ of cell position in the light receiving element;
   adder means capable of being reset by said gate signal and successively adding the output $C_i$ of each cell in the light receiving element to be scanned in response to said sample hold signal to obtain an addition value $\Sigma C_i$;
   sum of products calculating means capable of being reset by said gate signal, for multiplying the output $C_i$ of each cell in the light receiving element to be scanned in response to the sample hold signal by said value $x_i$ of each cell position outputted from the cell counter and successively summing up these multiplied values to obtain a summed-up value $\Sigma C_i \cdot x_i$; and
   division means for dividing said summed-up value $\Sigma C_i \cdot x_i$ obtained by the sum of products calculating means by said addition value $\Sigma C_i$ obtained by the adder means to calculate a center of gravity position $\Sigma C_i \cdot x_i / \Sigma C_i$ of receiving beams and outputting the center of gravity position as the light receiving position.

2. A position detecting apparatus for a laser sensor as recited in claim 1, further comprising:
   a comparator for comparing the output $C_i$ of each cell with a predetermined threshold value $V_s$ and generating a comparator output signal when the output $C_i$ of each is equal to or greater than the predetermined threshold value $V_s$;
   a threshold counter capable of being reset in response to the comparator output signal fed from said comparator, for counting a cell number to be scanned after said comparator output signal disappears and generating a threshold counter output signal when the cell number exceeds a predetermined value, wherein said adder means, sum of products calculating means and division means are all reset in response to the threshold counter output signal;
   a plurality of latch buffers connected in series, each respectively functioning to transfer stored data to a corresponding succeeding buffers in response to the threshold counter output signal fed from said threshold counter, and storing the center of gravity position fed from the division means in a first step buffer thereof, said latch buffers being reset by said gate signal; and
   position detecting means for obtaining a light receiving position of a primary reflection beam based on the center of gravity position stored in each said plurality of latch buffers.

3. A position detecting apparatus for a laser sensor as recited in claim 2 further comprising:
   means for changing a scanning angle of a laser beam in synchronization with said gate signal, wherein:
   said position detecting means for obtaining the light receiving position at which only one memorizing data is supplied from said plurality of latch buffers in the beginning of the scanning operation of the laser beams,
   means for obtaining a second light receiving position corresponding to a scanning angle immediately before a plurality of memorizing data is obtained,
   means for obtaining a third light receiving position corresponding to a scanning angle immediately after the plurality of memorizing data are no longer present, and
   means for obtaining a fourth light receiving position at which only one stored data is supplied from said plurality of latch buffers at the end of the scanning operation; and
   storage means for storing respective light receiving positions.

4. A position detecting apparatus for a laser sensor as recited in claim 3, further comprising:
   means for obtaining a first equation representing a first straight line passing through two object positions, respectively corresponding to the first and second light receiving positions; and
   means for obtaining a second straight data line passing through two object positions, respectively corresponding to said third and fourth light receiving positions,
   said first and second straight data lines identifying the object position.

5. A position detecting apparatus for a laser sensor as recited in claim 4, further comprising:
   means for determining an intersection point of said first and second straight data lines, based on said first and second equations; and
   means for detecting a bent portion of the object based on said intersection point.

6. A position detecting apparatus for a laser sensor as recited in claim 2, further comprising:
   means for changing a scanning angle of a laser beam in synchronization with said gate signal, and wherein
   said position detecting means for obtaining the light receiving position of the primary reflection beam includes:
      storage means for storing a plurality of light receiving positions supplied from the plurality of latch buffers, and
      detecting means for detecting the closest scanning angle at which said plurality of light receiving positions most closely approach one another, thereby detecting a light receiving position of the smallest value from said storage means as a first light receiving position of primary reflection beam in a region from the minimum scanning angle to said most closest scanning angle, and detecting a light receiving position of the largest value from said storage means as a second light receiving position of a primary reflection beam in a region from said closest scanning angle to the maximum scanning angle.

7. A position detecting apparatus for a laser sensor as recited in claim 6, further comprising:
   means for obtaining the object position from the first and said second light receiving positions of the primary reflection beams;
   means for obtaining a first straight line representing a first object position based on said first light receiving position of the primary reflection beam and a second straight line representing a second object position based on said second light receiving position of primary reflection beam; and means for obtaining an intersection of said first and said second straight lines, said intersection indicative of a position of bent portion of the object.

8. A position detecting apparatus for a laser sensor as recited in claim 4, wherein said bent portion of the object is where one of a welding and a sealing of the object is present.

9. A position detecting apparatus for a laser sensor as recited in claim 7, wherein said bent portion of the object is where one of a welding and a sealing of the object is present.

10. A position detecting method for a laser sensor comprising a Charged Coupled Device functioning as a light receiving element for detecting an object position, said Charged Coupled Device receiving light from scanning an array of cells, each cell having a corresponding position value and outputting a corresponding cell output value, said position detecting method comprising the steps of:

initializing a sum of products value to a preselected value;

multiplying a corresponding cell output value by a corresponding position value of one cell of the array of cells to obtain a multiplied cell value;

adding the multiplied cell value to the sum of products value;

repeating the multiplying and adding for each selected cell of the array of cells, to obtain a final value of the sum of products value;

initializing a sum of cell outputs value to a preselected value;

adding the corresponding cell output value for each of the selected cells of the array of cells to the sum of cell outputs value; and dividing the final sum of products value by the sum of cell output value to obtain a light receiving position.

11. A position detecting method for a laser sensor as recited in claim 10, further comprising the steps of:

initializing a counter value in a counter means;

counting a number of cells to be scanned when said corresponding cell output value of the selected cell falls below a preselected voltage threshold value until the number of cells counted equals a preselected cell number value;

generating a counter output value when the number of cells counted equals the preselected cell number value, wherein the sum of products value is divided by the sum of cell outputs value in response to the counter output value, the counter means is reset when one of the corresponding cell output values exceeds a preselected voltage threshold value, initialization of the sum of products value and the sum of cell outputs value occur simultaneously, and at least one light receiving position that exceeds a position threshold value is obtained during a preselected interval; and determining a primary light receiving position of a primary reflection beam of a laser beam based on the obtained at least one light receiving position.

12. A position detecting method for a laser sensor as recited in claim 11, further comprising the steps of:

changing a scanning angle of said laser beam to successively detect the at least one light receiving position;

storing a first light receiving position corresponding to a scanning angle immediately before a plurality of light receiving positions are detected at the same scanning angle, and storing a second light receiving position corresponding to the scanning angle immediately after a plurality of light receiving positions are detected at the same scanning angle; and obtaining a first equation representing a first straight data line passing through two object positions respectively corresponding to the first light receiving position and a third light receiving position at a scanning angle before said first light receiving position is scanned, and a second equation representing a second straight data line passing through two object positions respectively corresponding to the second light receiving position and a fourth light receiving position at a scanning angle after said second light receiving position is scanned, to identify the object position.

13. A position detecting method for a laser sensor as recited in claim 12, further comprising the step of:

determining an intersection point of said first and second straight data lines based on the first and second equations; and detecting a position of a bent portion of the object based on said intersection point.

14. A position detecting method for a laser sensor as recited in claim 11, further comprising the steps of:

successively storing at least one light receiving position detected by changing a scanning angle of said laser beam;

obtaining the closest scanning angle at which a plurality of light receiving positions detected at the same scanning angle approach each other most closely; and selecting the smaller valued one from among said plurality of light receiving positions when the scanning angle is less than said closest scanning angle and selecting a larger valued one from among said plurality of light receiving positions when the scanning angle is larger than said closest scanning angle and storing these selected light receiving positions as said light receiving position of a primary reflection beam.

15. A position detecting method for a laser sensor as recited in claim 14, further comprising the steps of:

obtaining the object position from the light receiving position of a primary reflection beam;

obtaining a first equation representing a first straight data line on the basis of said object position obtained from the light receiving position of the primary reflection beam in a scanning angle region from a minimum scanning angle to said closest scanning angle;

obtaining a second equation representing a second straight data line on the basis of said object position obtained from the light receiving position of the primary reflection beam in a scanning angle region from the closet scanning angle to the maximum scanning angle;

determining an intersection point of the first and second straight lines based on said first and second equations; and detecting a position of a bent portion of the object based on said intersection point.

16. A position detecting method for a laser sensor as recited in claim 13, wherein the determination of an intersection point identifies a position where one of a welding and a sealing of the object is present.

17. A position detecting method for a laser sensor as recited in claim 15, wherein the determination of an intersection point identifies a position where one of a welding and a sealing of the object is present.

* * * * *

UNITED STATES PATENT AND TRADEMARK OFFICE
CERTIFICATE OF CORRECTION

PATENT NO. : 5,399,870
DATED : March 21, 1995
INVENTOR(S) : Torii et al

It is certified that error appears in the above-indentified patent and that said Letters Patent is hereby corrected as shown below:

Title Page,

Item [75], after "Torii," delete "Hachioji" and insert --Tokyo--; delete "Minamitsuru" (all four occurrences) and insert --Yamanashi--

Item [56], Foreign Patent Documents, delete "2-172214" and insert --62-172214--.

Col. 2, line 33, insert --,-- after "assumptions"

UNITED STATES PATENT AND TRADEMARK OFFICE
CERTIFICATE OF CORRECTION

PATENT NO. : 5,399,870
DATED : March 21, 1995
INVENTOR(S) : Torii et al

It is certified that error appears in the above-indentified patent and that said Letters Patent is hereby corrected as shown below:

Col. 6, line 26, insert --on-- after "position"

Col. 6, line 68, delete "beam-is" and insert --beam is --

Col. 12, line 20, delete "it becomes"

Col. 12, line 30, insert --,-- after "Consequently"

Col. 19, line 41, insert --,-- after "(c-1)$\Delta\theta$".

Signed and Sealed this

Fourth Day of July, 1995

Attest:

BRUCE LEHMAN

Attesting Officer

Commissioner of Patents and Trademarks